US006415153B1

(12) United States Patent
Liew

(10) Patent No.: US 6,415,153 B1
(45) Date of Patent: Jul. 2, 2002

(54) SYSTEM AND METHOD FOR AGGREGATE OVERLOAD CONTROL

(75) Inventor: William J. Liew, Montville, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/407,882

(22) Filed: Sep. 29, 1999

(51) Int. Cl.$^7$ .................................................. H04B 7/00
(52) U.S. Cl. ........................ 455/453; 455/560; 455/561; 455/575; 455/91; 455/115; 455/126
(58) Field of Search .................................. 455/560, 561, 455/575, 91, 115, 126, 127, 450, 453, 522, 69; 370/320, 329, 341, 342

(56) References Cited

U.S. PATENT DOCUMENTS 5,715,526 A   2/1998   Weaver et al. .............. 455/126

FOREIGN PATENT DOCUMENTS

WO   WO9708909   3/1997

*Primary Examiner*—Thanh Cong Le
(74) *Attorney, Agent, or Firm*—Harness, Dickey & Pierce, P.L.C.

(57) ABSTRACT

A wireless communications system and method controls network load by selectively scaling aggregate base station transmit signals. In one implementation, aggregate in-phase (I) and quadrature (Q) channel transmit signals are multiplied by a scaling coefficient output by an aggregate overload controller based on load levels relative to a threshold. By scaling aggregate I- and Q-channel transmit signals when load level measurements indicate a high load situation, handoff control measurements made at mobile subscriber terminals, such as received signal strength from the base station, bit/frame error rates, and signal-to-noise ratio, will be affected, thereby prompting mobile subscriber terminals at the cell/sector boundaries to request handoff to an adjacent cell/sector. Thus, load is balanced between a number of cells/sector to increase network capacity and prevent overload without relying on a call admission/blocking scheme.

18 Claims, 5 Drawing Sheets

SYSTEM AND METHOD FOR AGGREGATE OVERLOAD CONTROL

BACKGROUND OF THE INVENTION

1. Field of the Invention

The present invention relates to the field of wireless communications.

2. Description of Related Art

In wireless communication networks based on spread spectrum technology, such as a Code Division Multiple Access (CDMA) network, a plurality of mobile subscriber terminals ("mobiles") share the same radio frequency (RF) bandwidth, and are separated by employing different Walsh codes or other orthogonal functions. As compared to communication systems which create multiple channels from a single RF band by assigning different time slots to users, i.e., Time Division Multiple Access (TDMA), or subdividing an RF band into a plurality of sub-bands, i.e., Frequency Division Multiple Access (FDMA), using orthogonal code sequences to form separate channels enables a CDMA system to exhibit "soft" network capacity. In other words, the number of mobiles which can share a given RF bandwidth at one time is not fixed, and instead is typically limited only by the degradation of service quality caused by interference from other users of the same and adjacent cells/sectors. The resulting tradeoff between network capacity and service quality in a CDMA system is typically resolved by reverse link (mobile to base station) power control techniques which adaptively set mobile transmit power to the minimum level needed to maintain adequate performance.

Despite the use of reverse link power control techniques to reduce co-channel interference and increase capacity, overload may occur in network cells/sectors when the number of mobiles being served exceeds the maximum number at which target call quality (typically represented as the ratio of energy per bit, $E_b$, to noise and interference, $N_o$, in a given bandwidth) can be maintained, for example when a large number of mobiles attempt to communicate with a single base station at once. One previously implemented technique for avoiding overload relies on a call admission/blocking scheme to guarantee adequate communication quality by blocking service to additional subscribers when load levels exceed a certain threshold. Such call admission schemes, however, may result in unacceptable service outages.

SUMMARY OF THE INVENTION

The present invention is a system and a method which scales base station transmit signals in a wireless communication network in response to high load levels, thereby affecting handoff control values measured at served mobiles to "push" mobiles to adjacent cells/sectors and avoid overload conditions. In one implementation, a base station overload controller scales the amplitude of aggregate forward link (base station to mobile) transmission signals as a function of the difference between aggregate transmit signal magnitudes and a threshold level. By scaling aggregate base station transmit signals, which include control signal components (e.g., a pilot signal component in a CDMA system), handoff control values, including receive signal strength, bit/frame error rates, and signal-to-noise ratio, measured at mobiles within the network service area are affected. Depending on the location of mobiles and the degree to which the aggregate base station transmit signals are scaled, a percentage of served mobiles, particularly those at cell/sector boundaries, will request handoff to an adjacent cell/sector. As the load level increases relative to the threshold level, the degree of scaling likewise increases, thereby more significantly affecting handoff control values measured at mobiles within the network service area, and causing an increased number of handoffs to balance load between a plurality of cells/sectors. Thus, the present invention increases network capacity and prevents overload without relying solely on a call admission scheme.

In one embodiment, the present invention is an aggregate overload controller which samples and sums aggregate in-phase (I) channel and quadrature (Q) channel transmit signal magnitudes over a load measurement period to obtain a load measurement value, and outputs a scaling coefficient as a function of the difference between the load measurement and a threshold. The aggregate overload controller initially sets the scaling coefficient to 1, and maintains the scaling coefficient at 1 as long as the load measurement value remains below the threshold. When the load measurement first exceeds the threshold, the scaling coefficient from the preceding load measurement period (i.e., 1) is decreased by an offset value which is calculated as a function of the difference between the load measurement value and the threshold. In one implementation, the updated scaling coefficient is calculated as:

$$S_M = \min\{1, S_{M-1} + \mu(E_{th} - E_M)\}, \quad (1)$$

where $S_{M-1}$ is the scaling coefficient from the previous load measurement period, $E_{th}$ is the threshold, $E_M$ is the load measurement for the current load measurement period, and $\mu$ is a constant. The constant $\mu$ may be set to a small value, e.g., 0.01, to prevent substantial fluctuations in the scaling coefficient $S_M$, and thereby avoid network instability.

I- and Q-channel multipliers multiply the scaling coefficient $S_M$ received from the aggregate overload controller by aggregate I- and Q-channel transmit signals received from a baseband processor. The resulting scaled I- and Q-channel transmit signals are received by an RF processor, which performs digital-to-analog conversion, low-pass filtering, modulates the scaled I- and Q-channel transmit signals onto separate RF carriers, combines the modulated I- and Q-channel carriers, and outputs the combined RF transmit signal to base station antenna for transmission.

BRIEF DESCRIPTION OF THE DRAWINGS

Other aspects and advantages of the present invention will become e apparent upon reading the following detailed description, and upon reference to the drawings in which.

DETAILED DESCRIPTION

The present invention is a system and method which scales base station transmit signals in a wireless communications network, such as a CDMA network, to affect handoff control values measured at mobiles within the network area under high load conditions, and thereby prevent overload conditions. An illustrative embodiment of an overload control system and method according to the present invention is described below.

Figure 1:
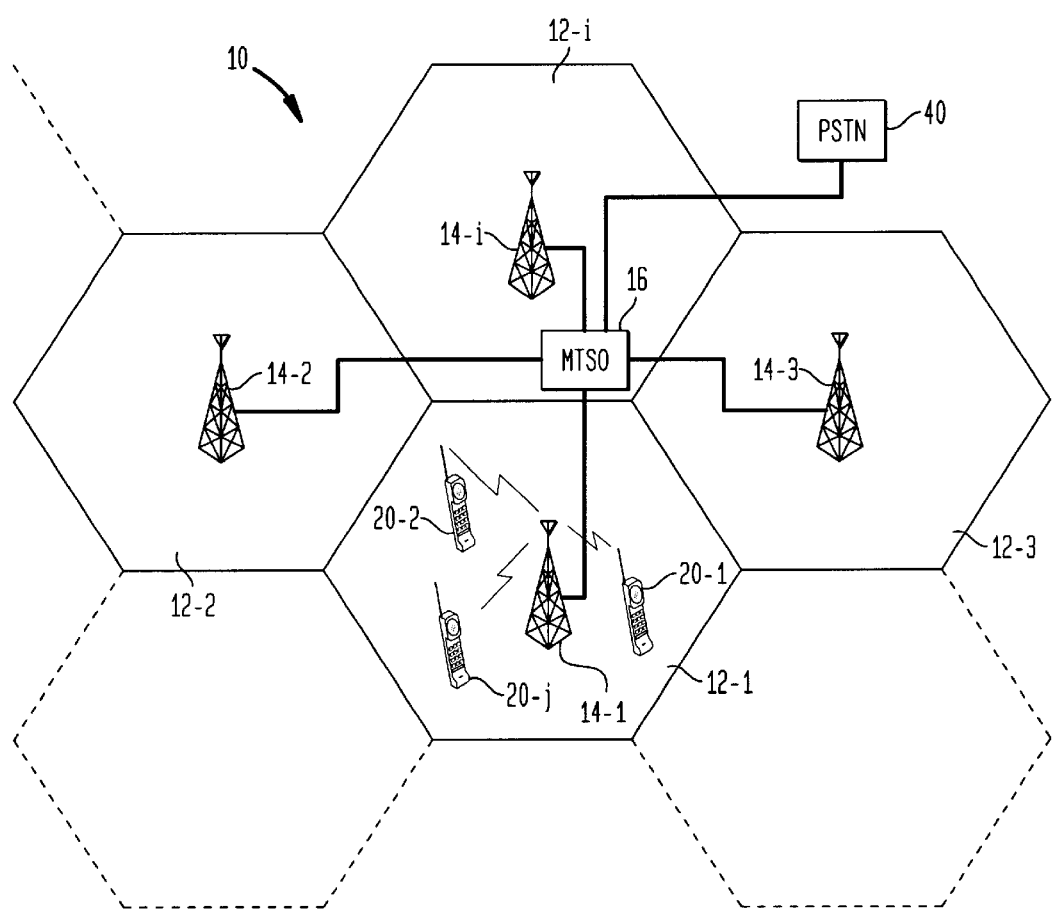
FIG. 1 illustrates an exemplary wireless network configuration suitable for implementing embodiments of the present invention.

Referring to FIG. 1, there is shown a wireless network configuration 10 suitable for implementing embodiments of the present invention. The wireless network 10 includes a plurality of geographic sub-areas ("cells") 12-1, ..., 12-i. Each cell 12-1, ..., 12-i has a corresponding base station 14-1, ..., 14-i for providing communication service to mobiles located therein, such as mobiles 20-1, ..., 20-j located in cell 12-1. Each of the base stations 14-1, ..., 14-i is connected (e.g., via a trunk line) to a mobile telephone switching office (MTSO) 16. The MTSO 16 manages communication within the network, and serves as an interface between the wireless network and a public switched telephone network (PSTN) 40.

As will be apparent to those skilled in the art, numerous variations on the wireless network 10 illustrated in FIG. 1 are possible. For example, each of the cells 12-1, ..., 12-i may be divided into a number of sectors. Furthermore, although the cells 12-1, ..., 12-i are shown as hexagonal-shaped areas, different cell shapes are possible.

Figure 2:
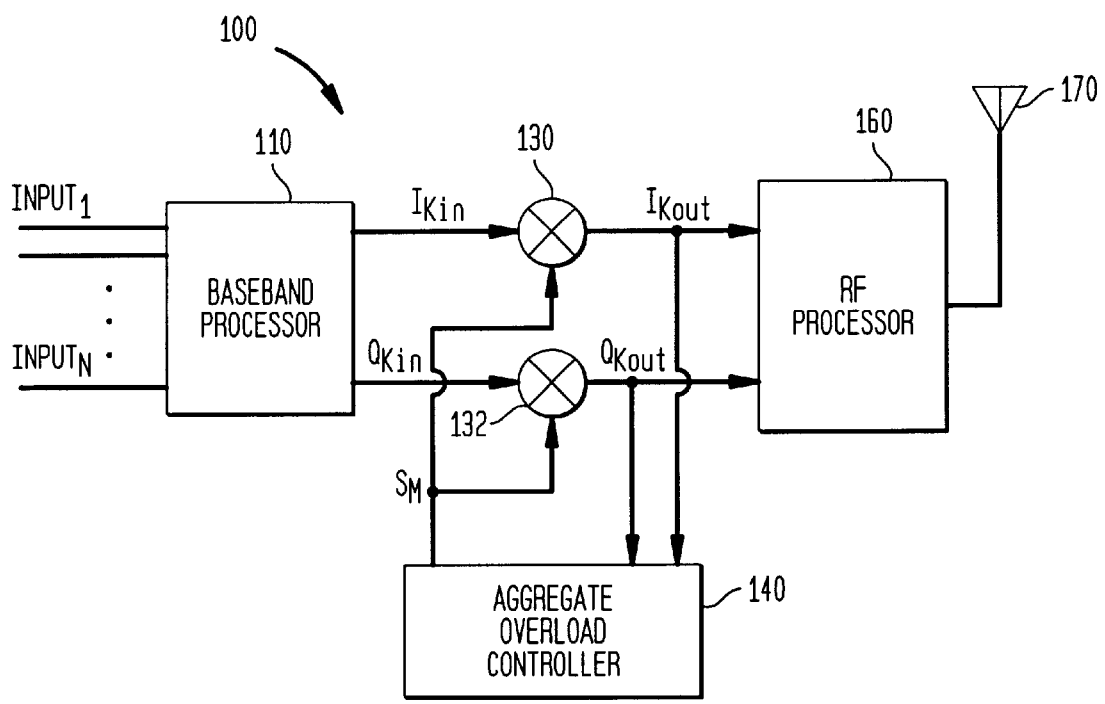
FIG. 2 is a general block diagram depicting certain components of a base station transmitter according to embodiments of the present invention

FIG. 2 is a general block diagram illustrating select components of a base station transmitter 100 according to one exemplary implementation of the present invention. As shown in FIG. 2, the base station transmitter 100 includes a baseband processor 110 which receives a plurality of base band communication signals $input_1$, $input_N$. These baseband communication signals $input_1$, ..., $input_N$ may include voice/data traffic received from the MTSO 16, as well as control information, e.g., pilot, paging, and synchronization signals, to be transmitted. For the exemplary implementation illustrated in FIG. 2, the baseband processor 110 utilizes a spectrally efficient modulation scheme, such as Quadrature Phase Shift Keying (QPSK), to output separate aggregate I- and Q-channel transmit signals. It should be realized, however, that principles of the present invention may be applied to base station transmitters which do not form separate I- and Q-channel transmit signals.

An I-channel multiplier 130 receives the aggregate I-channel transmit signal from the baseband processor 110, and multiplies the received aggregate I-channel transmit signal by a scaling coefficient $S_M$ received from an aggregate overload controller 140. Similarly, a Q-channel multiplier 132 receives an aggregate Q-channel transmit signal output by the baseband processor 110, and multiplies the received Q-channel transmit signal by the scaling coefficient SM received from the aggregate overload controller 140.

An RF processor 160 receives the scaled aggregate I- and Q-channel transmit signals from the I-and Q-channel multipliers 130 and 132. As described in more detail below, the RF processor 160 performs well known processing on the scaled aggregate I-and Q-channel transmit signals received from the multipliers 130 and 132, such as digital-to-analog conversion, band pass filtering, and RF carrier signal modulation, before outputting a combined RF signal to an antenna 170. The aggregate overload controller 140 also receives the outputs of the I- and Q-channel scaling multipliers 130 and 132 to calculate updated scaling coefficients SM in a manner described in detail below. The aggregate overload controller 140 may be implemented, for example, as an application-specific integrated circuit (ASIC) or as computer-executed software.

Figure 3:
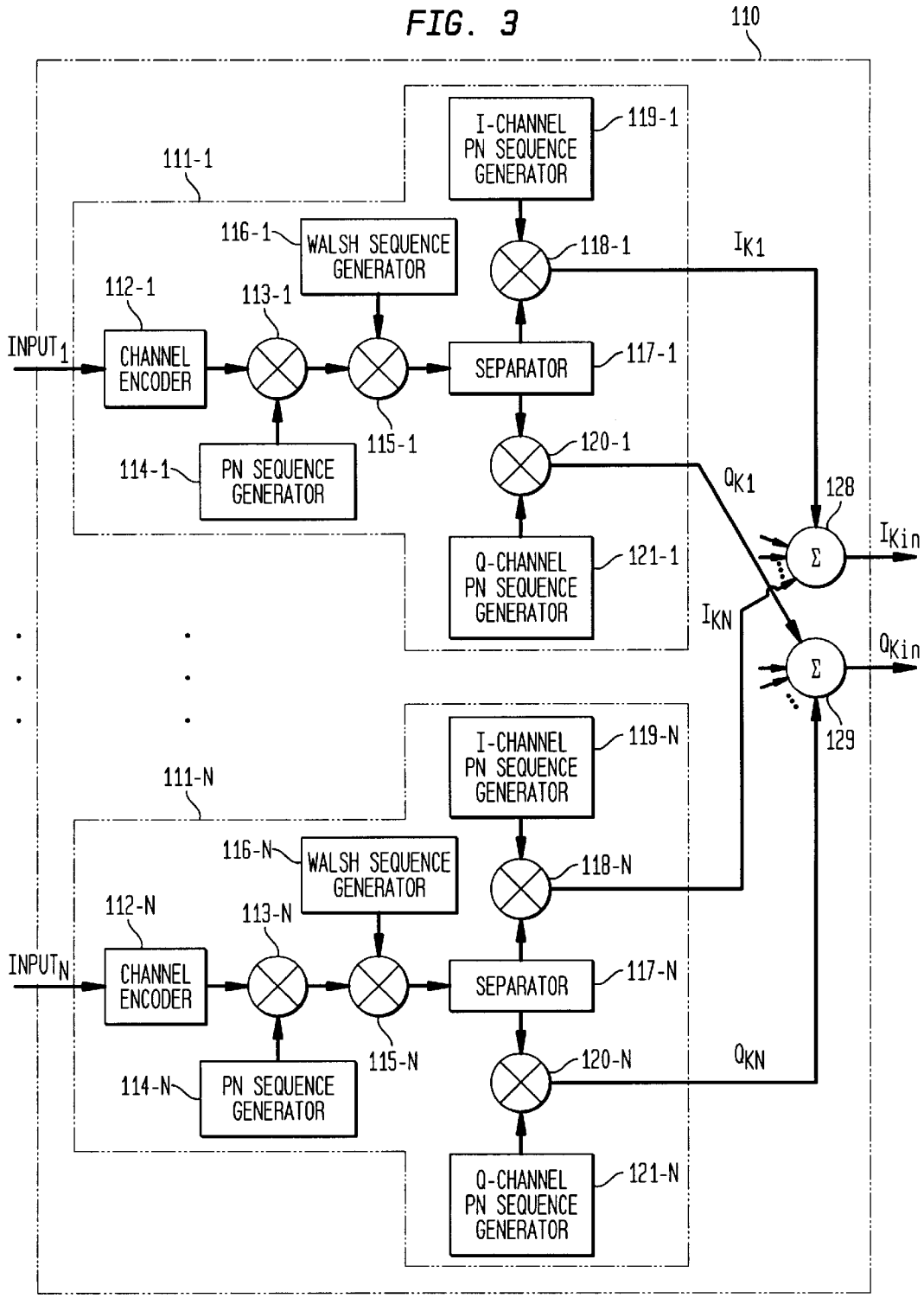
FIG. 3 is a block diagram depicting an exemplary baseband processor of a base station transmitter which generates aggregate I- and Q-channel transmit signals which are scaled by a scaling coefficient from an aggregate overload controller according to an embodiment of the present invention.

FIG. 3 is a block diagram depicting select components of an exemplary baseband processor 110 for use in the base station transmitter configuration 100 according an implementation of the present invention. As illustrated in FIG. 3, the baseband processor 110 includes a number of baseband processing units 111-1, ..., 111-N, respectively corresponding to input communication signals $input_1$, $input_N$. Each baseband processing unit 111-1, ..., 111-N outputs an I-channel signal $I_{K1}$, ..., $I_{KN}$ and a Q-channel signal $Q_{K1}$, ..., $Q_{KN}$. The baseband processor 110 further includes an I-channel summing unit 128 which generates an aggregate I-channel transmit signal from all the I-channel signals $I_{K1}$, ..., $I_{KN}$ received from the broadband processing units 111-1, ..., 111-N, and a Q-channel summing unit 129 for generating an aggregate Q-channel transmit signal from the Q-channel signals $Q_{K1}$, ..., $Q_{KN}$ received from the individual baseband processing units 111-1, ..., 1 1 1-N.

As will be apparent to those skilled in the art, each baseband processing unit 111-1, ..., 111-N includes conventional components for CDMA communication, such as specified in the CDMA-2000 Standard proposed by the U.S. Telecommunication Industry Association (TIA) to the International Telecommunications Union (ITU). Although a specific baseband processing unit configuration is shown in FIG. 3, it should be realized that principles of the present invention are not limited to a particular baseband processing configuration.

Referring again to the exemplary configuration of FIG. 3, each baseband processing unit 111-1, ..., 111-N includes a channel encoder 112-1, ..., 112-N, e.g., a convolutional encoder, which generates encoded blocks of predetermined length from the corresponding input communication signals $input_1$, ..., $input_N$, to protect information bits therein with error correction codes. A first multiplier 113-1, ..., 113-N multiplies the encoded blocks output by the channel encoder 112-1, ..., 112-N with a designated PN code sequence, assigned to the mobile intended to receive the input signal, output by a PN sequence generator 114-1, ..., 114-N. A second multiplier 115-1, ..., 115-N multiplies the output of the first multiplier 113-1, ..., 113-N by a Walsh code sequence, for example containing values from a row of a Walsh function matrix, generated by a Walsh sequence generator 116-1, ..., 116-N. As is well known, combining a communication signal with an orthogonal Walsh code sequence spreads the input data signal over the bandwidth spectrum to prevent co-channel interference.

To achieve QPSK modulation, a separator unit 117-1, ..., 117-N divides the output of the second multiplier 115-1, ..., 115-N into even and odd bits. As is well known, QPSK modulation allows two information bits to be transmitted simultaneously on orthogonal carriers. A third multiplier 118-1, ... 118-N multiplies the even bits from the separator unit 117-1, ..., 117-N by an I-channel PN sequence output by an I-channel PN sequence generator 119-1, ..., 119-N. Similarly, a fourth multiplier 120-1, ..., 120-N multiplies the odd numbered bits from the separator unit 117-1, ..., 117-N by a Q-channel PN sequence output by a Q-channel PN sequence generator 121-1, ..., 121-N. The I- and Q-channel summation units 128 and 129 respectively receive the I- and Q-channel outputs from the individual baseband processing units 111-1, ... 111-N to generate aggregate I- and Q-channel transmit signals $I_{Kin}$ and $Q_{Kin}$.

Figure 4:
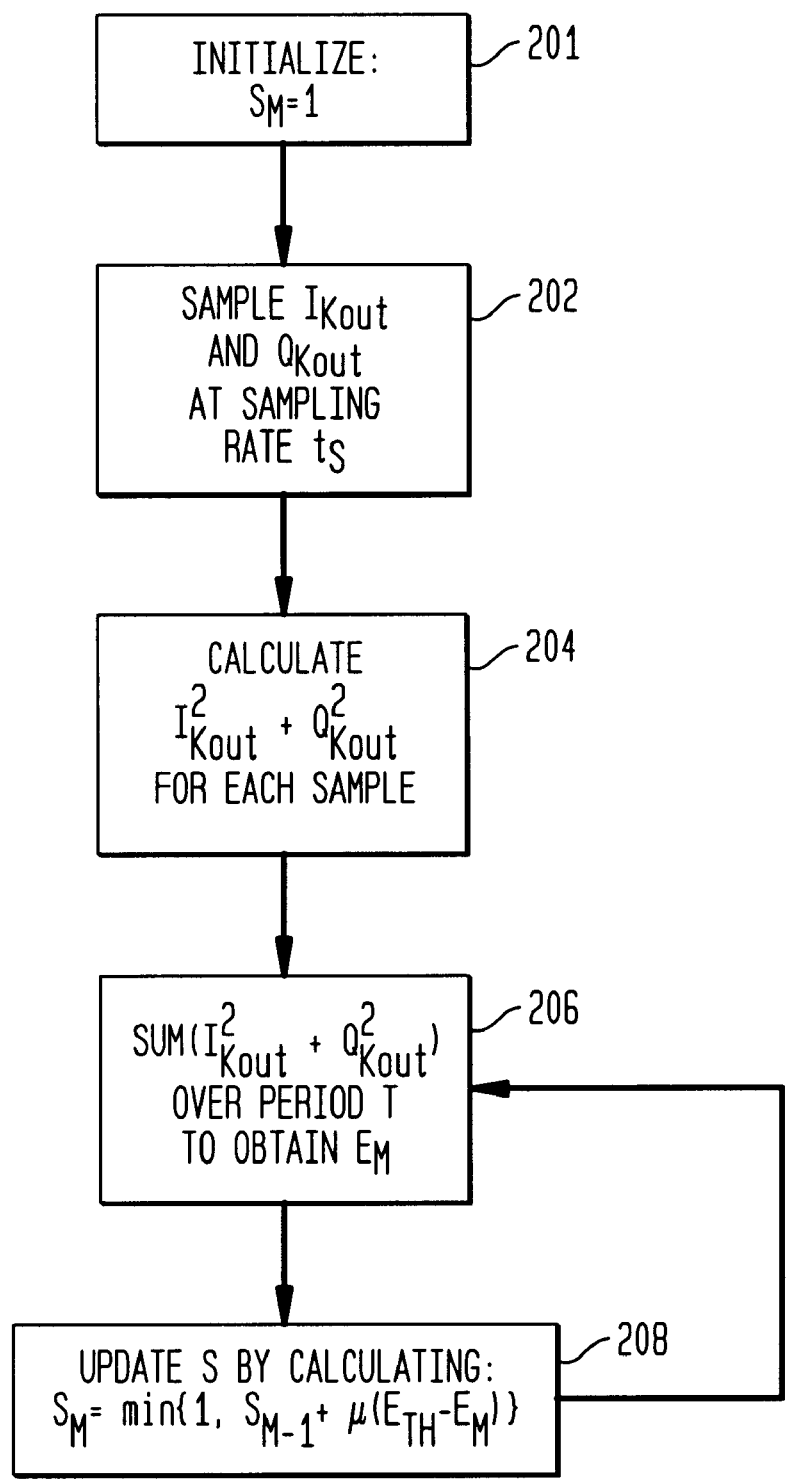
FIG. 4 is a flow diagram illustrating an exemplary operation performed by the aggregate overload controller to calculate a scaling coefficient according to an embodiment of the present invention.

FIG. 4 is a flow diagram illustrating an exemplary calculation performed by the aggregate overload controller 140 to generate and update the scaling coefficient $S_M$. As illustrated in FIG. 4, the aggregate overload controller 140 initially sets $S_M$ equal to 1 (Step 201), and samples the scaled I-channel and Q-channel transmit signals $I_{kout}$ and $Q_{kout}$, received from the multipliers 130 and 132, at a sampling rate $t_s$ (Step 202). Next, the aggregate overload controller 140 calculates $(I_{kout}^2+Q_{kout}^2)$ for each sample (Step 204), and obtains the sum of $(I_{kout}^2+Q_{kout}^2)$ over a load measurement period T (e.g., 20 milliseconds) to calculate a load measurement, $E_M$ (Step 206). Over this load measurement period, several thousand samples of $I_{kout}$ and $Q_{kout}$ may be taken. Although the calculation of Step 206 provides a suitable load measurement for controlling scaling, it should be realized that other techniques for obtaining a load measurement may be used. For example, a total Receive Signal Strength Indicator (RSSI) value at the base station, or the number of users being served by the base station, may be relied on to represent load.

Next, the aggregate overload controller 140 determines an updated scaling coefficient $S_M$ by calculating:

$$S_M = \min\{1, S_{M-1}+\mu(E_{th}-E_M)\}, \quad (1)$$

where $S_{M-1}$ is the scaling coefficient from the preceding load measurement period, $E_{th}$ is a threshold level, and $\mu$ is a constant (Step 208). The constant $\mu$ may be set to a relatively small value, e.g., 0.01, to limit fluctuations in the scaling coefficient $S_M$, and thereby avoid network instability. This operation is repeatedly performed to successively update the scaling factor $S_M$. It should be recognized that equation (1) represents an exemplary calculation for updating the scaling factor $S_M$, and may be modified in various ways without departing from the spirit and scope of the present invention.

Figure 5:
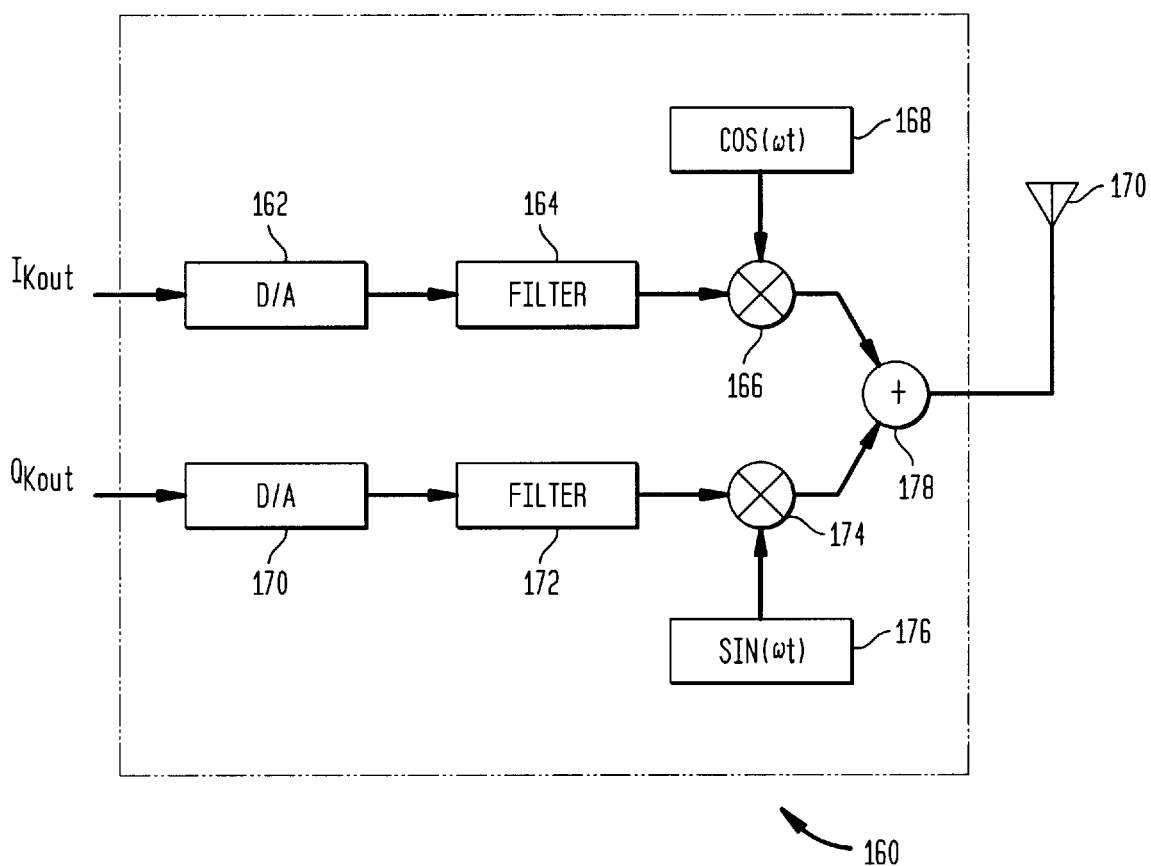
FIG. 5 is a block diagram of an exemplary RF processor of the base station transmitter according to an embodiment of the present invention.

FIG. 5 is a block diagram depicting select components of an exemplary RF processor 160 used in the base station transmitter 100 shown in FIG. 2. As shown in FIG. 5, the RF processor 160 includes an I-channel digital-to-analog converter 162 and a Q-channel digital-to-analog converter 170 for respectively converting $I_{kout}$ and $Q_{kout}$ to analog form. I-channel and Q-channel filters 164 and 172 respectively low pass filter the analog I- an Q-channel signals received from the digital-to-analog converters 162 and 170. A first multiplier 166 multiplies the I-channel signal output by filter 164 with an I-channel RF carrier signal Cos(ωt), and a second multiplier 174 multiplies the Q-channel signal outputted by filter 172 with a Q-channel RF carrier signal Sin((ωt). A combiner 178 combines the RF signals output by the first and second multipliers 166 and 176, and outputs a composite RF transmit signal to the antenna 170 for transmission.

By scaling I- and Q-channel transmit signals handoff control values measured at the mobiles, such as receive signal strength from the base station, bit/frame error rate, and signal-to-noise ratio will be affected to alter the cell/ sector boundaries under high load conditions. Depending on the location of mobiles relative to cell/sector boundaries and the degree of scaling, a percentage of mobiles will request handoff to adjacent cells/sectors, thereby balancing load to improve network capacity and avoid overload. Furthermore, by using a relatively small constant $\mu$, fluctuations in the scaling factor SK are limited to avoid network instability.

Although the present invention has been described in considerable detail with reference to certain embodiments, it should be apparent to those skilled in the art that various modifications and applications of the present invention may be realized without departing from the spirit and scope of the invention. For example, although the implementation illustrated in FIG. 2 scales Q- and I-channel transmit signals before such signals reach the RF processor 100, scaling may alternatively be performed as part of RF processing, e.g., after digital-to-analog conversion.

What is claimed is:

1. A method of controlling load in a wireless communications network, comprising:
   obtaining a load measurement;
   calculating a scaling coefficient as a function of a difference between said load measurement and a threshold; and
   scaling an aggregate base station transmit signal in accordance with said scaling coefficient.

2. The method of claim 1, wherein said calculating step is performed recursively.

3. The method of claim 1, wherein said calculating step calculates said scaling coefficient by solving:

$$S_M=\min\{1, S_{M-1}+\mu(E_{th}-E_M)\},$$

where $S_{M-1}$ is the scaling coefficient from a previous load measurement period, $E_{th}$ is the threshold, $E_M$ is the load measurement for a current load measurement period, and $\mu$ is a constant.

4. The method of claim 3, wherein the constant $\mu$ limits fluctuations in the scaling coefficient $S_M$.

5. The method of claim 1, wherein said step of scaling scales each of an aggregate in-phase (I) channel transmit signal and an aggregate quadrature (Q) channel transmit signal in accordance with said scaling coefficient.

6. The method of claim 3, wherein said obtaining step obtains a load measurement by calculating $(I_{kout}^2+Q_{kout}^2)$, where $I_{kout}$ is a scaled aggregate I-channel transmit signal and $Q_{kout}$ is a scaled aggregate Q-channel transmit signal, and summing a plurality of $(I_{kout}^2+Q_{kout}^2)$ values calculated during a load measurement period.

7. The method of claim 1, wherein said wireless communications network is a Code Division Multiple Access (CDMA) network.

8. The method of claim 1, further comprising: transmitting the scaled aggregate base station transmit signal.

9. The method of claim 8, wherein said steps of scaling and transmitting alter cell/sector service boundaries for a corresponding network base station to balance load among a plurality of cells/sectors.

10. A system for controlling load in a wireless communications network, comprising:
    load measurement means for obtaining a load measurement;
    calculating means for calculating a scaling coefficient as a function of a difference between said load measurement and a threshold; and
    scaling means for scaling an aggregate base station transmit signal in accordance with said scaling coefficient.

11. The system of claim 10, wherein said calculating performed by said calculating means is done recursively.

12. The system of claim 10, wherein said calculating means calculates said scaling coefficient, $S_M$, by solving:

$$S_M=\min\{1, S_{M-1}+\mu(E_{th}-E_M)\},$$

where $S_{M-1}$ is the scaling coefficient from the previous load measurement period, $E_{th}$ is the threshold, $E_M$ is the load measurement for the current load measurement period, and $\mu$ is a constant.

13. The system of claim 12, wherein the constant $\mu$ limits fluctuations in the scaling coefficient $S_M$.

14. The system of claim 10, wherein said scaling means scales each of an aggregate in-phase (I) channel transmit signal and an aggregate quadrature (Q) channel transmit signal in accordance with said scaling coefficient.

15. The system of claim 14, wherein said load measurement means obtains a load measurement by calculating $(I_{kout}^2+Q_{kout}^2)$, where $I_{kout}$ is a scaled aggregate I-channel transmit signal and $Q_{kout}$ is a scaled aggregate Q-channel transmit signal, and summing a plurality of $(I_{kout}^2+Q_{kout}^2)$ values calculated during a load measurement period.

16. The system of claim 10, wherein said wireless communications network is a Code Division Multiple Access (CDMA) network.

17. The system of claim 10, further comprising:
transmitting means for transmitting the scaled aggregate base station transmit signal.

18. The system of claim 17, wherein said scaling means and said transmitting means alter cell/sector service boundaries for a corresponding network base station to balance load among a plurality of cells/sectors.

* * * * *